United States Patent Office 3,185,728
Patented May 25, 1965

3,185,728
ETHYLENE DIAMINE SALTS OF THIOPHOSPHONIC ACIDS
Elmer E. Schallenberg, Beacon, and Roger G. Lacoste, Hopewell Junction, N.Y., assignors to Texaco Inc., New York, N.Y., a corporation of Delaware
No Drawing. Filed June 20, 1960, Ser. No. 37,092
2 Claims. (Cl. 260—501)

This invention relates to novel amine salts of hydrocarbon thiophosphonic acids. More particularly, this invention relates to monoamine and diamine salts of hydrocarbyl thiophosphonic acids.

Alkaline earth metal salts of phosphorus sulfidehydrocarbon reaction products are known to be effective additives for lubricants employed in internal combustion engines. The novel amine salts of this invention formed by reaction of an organic aliphatic hydrocarbyl amine and a hydrolyzed phosphorus pentasulfide-hydrocarbon reaction product are useful as ashless detergents for lubricating oils and as dispersants for fuels, particularly middle distillate fuels. Our commonly-assigned copending application, Serial No. 37,090 filed of even date, now Patent No. 3,143,506, relates to lubricating compositions containing the amine salts of this invention.

The amine salts of hydrocarbyl thiophosphonic acids obtained by hydrolysis of hydrocarbon-$P_2S_5$ reaction products are represented by the following formulae:

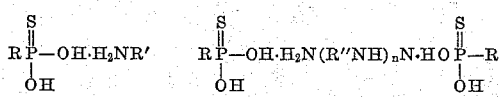

wherein R is a hydrocarbyl radical, R' is an aliphatic hydrocarbyl radical containing 1–24 carbon atoms and preferably 5–22 carbon atoms and R" is a divalent aliphatic hydrocarbyl radical containing 2–10 carbon atoms and $n$ is an integer having a value of 1–8. The amine and diamine reaction products are acid salts containing a replaceable hydrogen atom and are prepared by reaction of acid and amine in a ratio of 1 mol of hydrocarbyl thiophosphonic acid per primary amine radical present in the amine reactant. Acid amine salts of the above formulae were obtained regardless of the amount of amine employed in the preparation. When excess amine in excess of the ratio of 1 mol of acid per primary amino radical is employed, the excess amine does not react but is removed during purification of the amine salt.

As is well known, hydrocarbon-phosphorus pentasulfide reaction products are prepared by reaction of aromatic hydrocarbons, cycloaliphatic hydrocarbons and aliphatic hydrocarbons with $P_2S_5$ at elevated temperature. Although a wide variety of hydrocarbons such as aliphatic-substituted aryl compounds and aryl-substituted aliphatic compounds are usable as the hydrocarbon reactant, olefins are generally employed as the hydrocarbon reactant.

The olefinic hydrocarbons reacted with $P_2S_5$ usually contain at least 12 carbon atoms although lower molecular weight olefins can be employed. Monoolefin polymers such as isobutylene polymer, butylene polymer, propylene polymer and copolymers of monoolefins such as propylene-isobutylene copolymer are particularly preferred materials for reaction with $P_2S_5$. In general, monoolefin polymers and copolymers having an average molecular weight between about 400 and 5000 are employed with polymers and copolymers having an average molecular weight in the range from about 600 to 2000 being particularly preferred. Copolymers of conjugated dienes and monoolefins such as a copolymer of butadiene and isobutylene having an average molecular weight in the above-prescribed range also react with phosphorus pentasulfide.

Olefins useful for reaction with $P_2S_5$ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The reaction product obtained by reacting about 5 to about 40 percent $P_2S_5$ with a hydrocarbon at a temperature of from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbyl thiophosphonic acid and inorganic phosphorus acids. The hydrocarbyl thiophosphonic acid has the general formula:

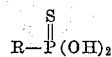

wherein R is the charge hydrocarbon radical and is usually an olefinic radical containing 12 to 100 carbon atoms.

Prior to the reaction with the amine, the inorganic phosphorous acids formed during hydrolysis are advantageously removed. A number of different procedures are available for removal of the inorganic phosphorus acids. In commonly-assigned copending applications Serial Nos. 750,874, filed July 25, 1958, now U.S. Patents 2,987,512 and 763,812, filed September 29, 1958 now U.S. Patent 2,951,835 by H. D. Kluge, J. W. Wisner, Jr. and R. G. Lacoste, removal of the inorganic phosphorus acids is effected by contact with synthetic hydrous alkaline earth metal silicates and synthetic hydrous alkali metal silicates, respectively. Another commonly-assigned copending application, Serial No. 841,668, filed September 23, 1959 by H. D. Kluge and R. G. Lacoste, now Patent No. 3,135,729 describes a process wherein inorganic phosphorus acids are removed from the hydrolyzed product by extraction with anhydrous methanol.

The monoamines employed in the formation of the novel amine salts of hydrocarbon thiophosphonic acids are represented by the following general formula: $R'NH_2$ wherein R' is an aliphatic hydrocarbyl radical containing 1–24 carbon atoms and is preferably an aliphatic hydrocarbyl radical containing 5–22 carbon atoms. Examples of effective amines are ethylamine, isopropylamine, n-propylamine, 2-ethylhexylamine, n-amylamine, t-octylamine, laurylamine and mixtures of primary aliphatic amines such as commercially available mixtures of t-alkyl primary amines. Primene 81-R is a mixture of branched chain t-alkyl amines containing 11–14 carbon atoms and Primene JM-T is a mixture of t-alkyl primary amines wherein the t-alkyl groups contain 18–22 carbon atoms.

The alkylene polyamines contain 2 primary amino groups and are represented by the formula:

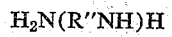

wherein R" is a divalent aliphatic hydrocarbyl radical containing 2–10 carbon atoms and $n$ is an integer having a value of 1–8. Examples of effective polyamines are ethylenediamine, 1,2-propylenediamine, 1,3-propylenediamine, 1,2-butylenediamine, 1,6-hexylenediamine, 1,8-octylenediamine, 1,4-butylenediamine, 1,3-diaminobutane, pentaethylenehexamine, tetraethylenepentamine, triethylenetetramine, tripropylenetetramine, tetrapropylenepentamine, hexapropyleneheptamine, and diethylenetriamine.

The preparation of the amine salts of this invention is simply effected by addition of amine to hydrocarbyl thiophosphonic acid, that is, a hydrolyzed hydrocarbon-$P_2S_5$ reaction product, and the resulting mixture refluxed for a relatively short period of time of the order of 0.5 to 2 hours. Temperature was then raised to between 90 and 220° C. while the product was blown with nitrogen until it was dried and free of unreacted amine. On cooling, there was obtained an acid amine salt of the structure shown above.

In preparing the amine salts, the hydrocarbyl thiophosphonic acid and amine are generally reacted in a ratio of 1 mol of acid per primary amine radical present in the amine reactant. The salts may also be prepared with an excess of amine over that indicated by this ratio in which instance the excess amine is removed during the elevated temperature blowing of the reactant.

The preparation of the novel acid amine salts of hydrocarbyl thiophosphonic acid is illustrated in the following examples:

Example 1

A polybutene-P₂S₅ reaction product was prepared by reacting polybutene having an average molecular weight of about 780 with P₂S₅ in a mol ratio of polybutene to P₂S₅ of 1.25 and in the presence of sulfur in an amount equal to 0.5 weight percent of polybutene. After reaction at 450° F. until the mixture is soluble in n-pentane, the reaction product was diluted with an approximately equal volume of naphthene base oil having an SUS at 100° F. of 100 and steamed at 375° F. for four hours in a nitrogen atmosphere and then dried by passage of nitrogen therethrough at the same temperature. The hydrolyzed product was extracted with an equal volume of methyl alcohol at 140° F. and to give a methanol extract containing inorganic phosphorus acids and a lubricating oil raffinate containing olefin-P₂S₅ product and having a Neut. No. of 28.8.

The polyolefin thiophosphonic acid was reacted with aqueous ethylenediamine in a mol ratio of 2 mols of polyolefin thiophosphonic acid per mol of ethylenediamine. After refluxing the mixture for about 1 hour, it was then heated to a temperature between 90 and 176° C. while nitrogen was passed therethrough, whereby the product was dried and unreacted amine removed. On cooling, there was obtained an acid amine salt of polybutylene thiophosphonic acid. Analysis of the salt showed a nitrogen content of 0.44% and established its structure as:

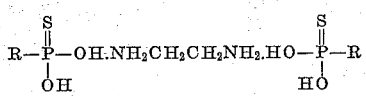

The theoretical N for this compound is 0.58%.

Example 2

The polybutene thiophosphonic acid obtained in Example 1 by hydrolysis and methanol extraction of a polybutene-P₂S₅ reaction product was reacted with ethylenediamine under similar conditions to those set forth in Example 1. In this example, the thiophosphonic acid was reacted with ethylenediamine in a mol ratio of 1 mol of acid per mol of amine. The resulting amine salt analyzed 0.44% nitrogen, indicating that an acid salt of the same structure shown in Example 1 was prepared despite the presence of a larger amount of amine.

Example 3

Polybutene thiophosphonic acid prepared as described in Example 1 was reacted wtih diethylenetriamine in a mol ratio of 2 mols of acid per mol of diethylenetriamine. The procedure employed was essentially the same as that described for the preparation of ethylenediamine salt in Example 1. Analysis of the product showed a nitrogen content of 0.63% and established that the product was an acid salt of the following formula:

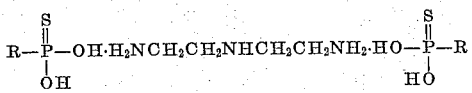

Theoretical N for this compound is 0.86%.

Example 4

The polybutene thiophosphonic acid prepared as described in Example 1 is reacted with tetraethylenepentamine in a mol ratio of 2 mols of acid per mol of tetraethylenepentamine by the same procedure described in Example 1 for the preparation of the ethylendiamine salt. Analysis of the product showed a 0.98% nitrogen content and established that the product was an acid salt of the following formula:

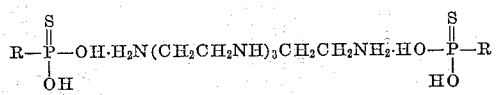

Theoretical N for this compound is 1.37%

Example 5

The polybutene thiophosphonic acid prepared as described in Example 1 was reacted with n-butylamine in a mol ratio of one mol of acid per mol of n-butylamine by the same procedure described in Example 1 for the preparation of the ethylenediamine salt. Analysis of the product showed a 0.57% nitrogen content and established that the product was an acid salt of the following formula:

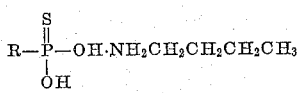

Theoretical N for this compound is 0.56%.

Example 6

The polybutene thiophosphonic acid prepared as described in Example 1 was reacted with Primene 81-R, a mixture of branched chain tertiary alkyl amines containing 11–14 carbon atoms in a mol ratio of one mol of acid per mol of mixed t-alkyl amines. The procedure employed in the preparation is the same as that prescribed in Example 1 for the preparation of the ethylene diamine salt. Analysis of the product showed 0.52% nitrogen content and established that the product was an acid salt of the following formula:

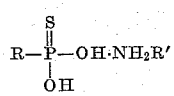

where R is a polybutene radical and R' denotes a mixture of tertiary alkyl radicals containing a mixture of 11 to 14 carbon atoms. Theoretical N for this compound is 0.54%.

Obviously many modifications and variations of the invention, as hereinbefore set forth, may be made without departing from the spirit and scope thereof, and therefore only such limitations should be imposed as are indicated in the appended claims.

We claim:

1. An ethylenediamine salt of hydrocarbyl thiophosphonic acid having the following formula:

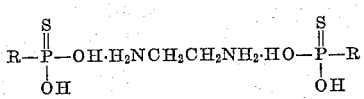

where R is an olefinic hydrocarbyl radical having at least 12 carbon atoms.

2. An amine salt having the formula

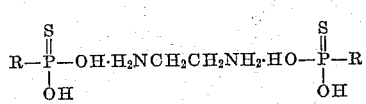

wherein R is a polybutene radical having at least 12 carbon atoms.

(References on following page)

References Cited by the Examiner

UNITED STATES PATENTS

| | | | |
|---|---|---|---|
| 2,767,165 | 10/56 | Smith et al. | 252—32.7 |
| 2,798,045 | 7/57 | Buck et al. | 252—32.7 |
| 2,809,934 | 10/57 | Alford et al. | 252—32.7 |
| 2,882,228 | 4/59 | Watson et al. | 252—32.7 |
| 2,900,376 | 8/59 | Sabol et al. | 252—32.7 |
| 2,907,713 | 10/59 | Lemmon et al. | 252—32.7 |
| 2,935,505 | 5/60 | Lacoste et al. | 252—46.6 |
| 3,108,959 | 10/63 | Kloss et al. | 252—32.7 |

OTHER REFERENCES

Freedman et al.: Chem. Reviews, June 1957, pages 495–497.

LORRAINE A. WEINBERGER, *Acting Primary Examiner.*

LEON ZITVER, *Examiner.*